June 3, 1930. H. T. WERK 1,761,858
SOD TRIMMING MACHINE
Filed March 1, 1928
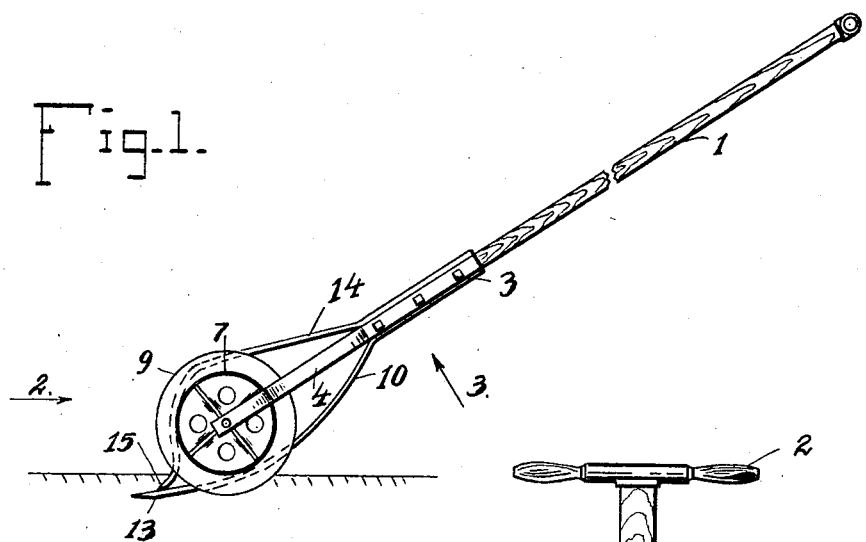
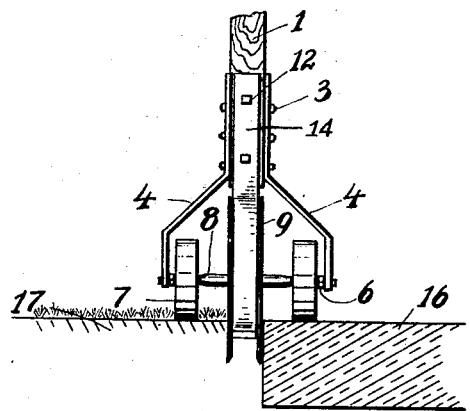
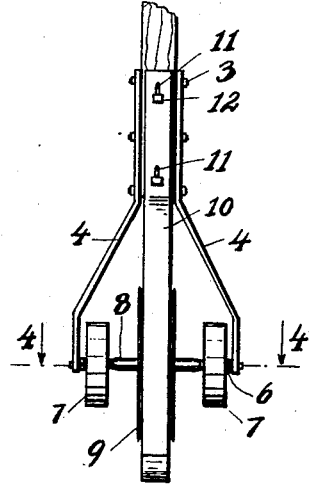
Inventor
H. T. Werk.

Patented June 3, 1930

1,761,858

UNITED STATES PATENT OFFICE

HENRY T. WERK, OF CLEVELAND, OHIO

SOD-TRIMMING MACHINE

Application filed March 1, 1928. Serial No. 258,300.

Where a lawn or like piece of ground terminates at a walk or similar surface that should be free from foliage it is customary to trim the grass or sod so that the edge is neat and does not present a frayed or irregular appearance. Heretofore the conventional way of trimming up a lawn along the walks as above set forth has been to employ shears to cut the grass, or the sod is trimmed with a hoe or like implement.

The primary object of this invention is to provide a tool for trimming the edges of a lawn or grass plot. I have found that it is highly desirable to provide a narrow strip or trench of earth free from grass along the edges of a walk, and to this end a tool provided by my invention preferably embodies means for forming such a strip of earth.

In carrying out my idea more in detail, I employ rollers that carrying a plow member which digs into the ground to loosen the sod therefrom. This plow member is followed by cutter means that function to free the sod dug by the plow member from the surrounding grass, whereby a trench having a very even edge along the grass plot is left after operation of the tool.

A more particular object of the invention is to provide a tool of the character referred to which will dig trenches of different depths. This object is achieved by mounting the plow member on a handle which is pivoted between the rollers so that a varying of the angle of inclination of the handle with respect to the ground affords changes in the depth to which the plow digs.

As my novel tool is intended for use under a wide variety of conditions the occasion often arises when it is desirous and in fact necessary to change the relationship of the plow with respect to the main handle member, and I therefore provide means for accomplishing this object. One of the plow carrying members is provided with elongated slots thru which clamping bolts pass in affixing the carrier to the handle. By varying the relation of the carrier to the handle thru the medium of the bolt and slot connection, the tool is adapted to dig trenches of different depths while the handle remains in substantially the same position.

To the end of providing a tool for the purpose previously specified of simplified and effective construction I avail of cutting means in the form of spaced discs having cutting edges. These discs are preferably mounted on the same axis with the rollers and necessarily have greater diameters than the rollers.

Various other more detailed objects and advantages will in part become apparent, and in part be hereinafter stated as the description of the invention proceeds.

For a full and more complete understanding of my invention reference may be had to the following description and accompanying drawings, in which Figure 1 is a view in side elevation of a tool made in accordance with this invention.

Figure 2 is a front view of the tool shown in Figure 1 in operative position with respect to a concrete walk and grass plot.

Figure 3 is a rear view of the tool and,

Figure 4 is a fragmentary view in section taken about on the line 4—4 of Figure 3.

While a preferred embodiment of the invention is herein specifically set forth it is to be understood that I am not to be limited to the exact constructions illustrated and described because various modifications of these details may be provided in putting the invention into practice within the purview of the appended claims.

A desirable exemplification of my invention comprises a main handle body 1 that has affixed at one end thereof any suitable gripping or operating means such as a cross bar 2. Fastened to the handle at the opposite sides of its other end by appropriate means such as bolts 3 are brackets 4. The brackets 4 contain offset portions that provide a substantial space between the ends thereof. These ends provide a bearing for a pivotable member or axle 5. Carried by the axle 5 between the brackets 4 and spaced therefrom by any preferred instrumentalities such as nuts 6 are rollers 7. These rollers are spaced from one another by a sleeve 8 also carried by the axle 5, and which sleeve has positively fixed thereto cutting discs 9 suitably positioned to provide a space therebetween which is the width of the trench which operation of the tool forms. A carrier member 10 having slots 11 adjacent to one end is fastened to the underside of the handle 1 at its lower end by bolts and nuts 12. The carrier member 10 is of a curved formation and passes between cutting discs 9. The free extremity of this carrier member carries a plow 13, which, in the present instance is made integral with the carrier member 10, although it is well within the scope of my invention to provide a separate plow share. A second carrying member 14 is positively and unadjustably fastened to the upper side of the handle 1 opposite to the connection of the carrier 10 thereto and is preferably held in this position by the bolts and nuts 12. Carrier member 14 is also of a curved configuration and has its free end joined to the carrier 10 adjacent to the plow share 13 in any appropriate manner such as by welding at the spot 15. It is obvious that an adjustment of the carrier member 10, permissible because of the bolt and slot connection with the handle 1 varies the depth to which the plow digs when the handle 1 remains in substantially the same position as shown in Figure 1. Further variation of this depth and the angle of the plow to the ground may be afforded by changing the angle of inclination of the handle 1 with respect to the ground.

In operation of the tool one of the rollers 6 will operate on the surface free from grass such as the concrete walk designated 16 in Figure 2, while the other roller operates on the surface of the lawn or grass plot designated 17. The plow 13 digs up the sod adjacent to the walk from any desired depth and the cutter discs 9 following the plow share cut this sod loose in a strip providing an even edge that presents a very pleasing appearance.

Having thus described my invention, what I claim as new and desire to secure by Letters Patent in the United States, is:—

1. A tool of the class described, comprising, in combination, a handle, rollers carried by the handle, a plow member also carried by the handle, cutting disks rearwardly disposed from said plow member, and means associated with the plow member, whereby sod is lifted up and thrust into the cutting disks.

2. A tool of the class described, comprising, in combination, a plow member, cutting disks rearwardly disposed of said plow member and lifting means fastened to the plow member, and passing over the axis of the cutting disks, said means lifting the sod into the cutting disks so as to provide a shearing action on the sod.

3. A tool of the class described, comprising, in combination, a handle, cutting disks carried by the handle, a plow member, and means associated with the plow member, whereby the plowed material is prevented from passing under the cutting disks.

In testimony whereof I affix my signature.

HENRY T. WERK.